(12) United States Patent
Altamura et al.

(10) Patent No.: US 8,265,866 B2
(45) Date of Patent: Sep. 11, 2012

(54) METHODS AND SYSTEMS FOR AUGMENTED NAVIGATION

(75) Inventors: Francesco Altamura, Ameglia (IT); Simone Cortesi, Linarolo (IT)

(73) Assignee: The Boeing Company, Chicago, IL (US)

( * ) Notice: Subject to any disclaimer, the term of this patent is extended or adjusted under 35 U.S.C. 154(b) by 8 days.

(21) Appl. No.: 12/968,918

(22) Filed: Dec. 15, 2010

(65) Prior Publication Data
US 2012/0158287 A1    Jun. 21, 2012

(51) Int. Cl.
*G01C 21/36* (2006.01)
(52) U.S. Cl. ......... 701/409; 701/426; 701/432; 701/438
(58) Field of Classification Search .................. 701/400, 701/408, 409, 420, 423, 426, 432, 438, 457, 701/461; 340/995.26–995.28
See application file for complete search history.

(56) References Cited

U.S. PATENT DOCUMENTS

| | | | |
|---|---|---|---|
| 6,037,936 A | 3/2000 | Ellenby et al. | |
| 6,181,302 B1 | 1/2001 | Lynde | |
| 6,415,227 B1 | 7/2002 | Lin | |
| 6,865,476 B1 | 3/2005 | Jokerst et al. | |
| 7,268,703 B1 | 9/2007 | Kabel et al. | |
| 7,301,536 B2 | 11/2007 | Ellenby et al. | |
| 7,369,102 B2 | 5/2008 | Luke et al. | |
| 7,430,461 B1 | 9/2008 | Michaels | |
| 7,463,981 B2 * | 12/2008 | Chang ........................... | 701/409 |
| 7,511,736 B2 | 3/2009 | Benton | |
| 7,793,230 B2 | 9/2010 | Burns et al. | |
| 2004/0179104 A1 | 9/2004 | Benton | |
| 2005/0228586 A1 * | 10/2005 | Yuasa et al. .................... | 701/208 |
| 2006/0026535 A1 | 2/2006 | Hotelling et al. | |
| 2007/0100547 A1 * | 5/2007 | Chang ........................... | 701/213 |
| 2009/0228820 A1 | 9/2009 | Kim et al. | |
| 2011/0166777 A1 | 7/2011 | Chavakula | |

FOREIGN PATENT DOCUMENTS
EP    2228625 A2    9/2010

OTHER PUBLICATIONS

European Search Report from application No. 11193892.4-1236; Feb. 21, 2012; 5 pages.

* cited by examiner

*Primary Examiner* — Richard M. Camby
(74) *Attorney, Agent, or Firm* — Armstrong Teasdale, LLP

(57) ABSTRACT

A navigation device is described that includes a processing device, a memory communicatively coupled to the processing device, the memory including a database of cartographic navigation map data, a first sensor operable to provide location data to the processing device, a display operatively coupled to the processing device, and an image acquisition device operatively coupled to the processing device. The processing device is programmed to, when in a first mode of operation, to cause the display to display a portion of the cartographic navigation map data, the displayed portion based on the location data received by the processing device. The processing device is further configured, when in a second mode of operation, to cause the display to display an image acquired by the image acquisition device, the image overlaid by one or more symbols indicative of one or more points of interest within the database of cartographic navigation map data, the one or more symbols correlated to the acquired image based on the location data received by the processing device.

18 Claims, 4 Drawing Sheets

METHODS AND SYSTEMS FOR AUGMENTED NAVIGATION

BACKGROUND

The field of the disclosure relates generally to navigation devices, and more specifically, to methods and systems for augmented navigation.

A continuing need exists for increased situational awareness in navigation in both standard and extreme conditions, including display of information of the surrounding environment in real-time.

Augmented reality is a term for a live direct or indirect view of a physical real-world environment. The environmental elements are augmented by computer-generated sensory input such as sound or graphics. In an augmented reality system a current perception of reality is enhanced. The augmentation provided by such systems is conventionally in real-time and in semantic context with environmental elements. One common example is the updating of sports scores on television during a sporting event. By adding computer vision and/or object recognition, the information about the surrounding real world of the user becomes interactive and usable.

BRIEF DESCRIPTION

In one aspect, a navigation device is provided that includes a processing device, a memory communicatively coupled to the processing device, the memory including a database of cartographic navigation map data, a first sensor operable to provide location data to the processing device, a display operatively coupled to the processing device, and at least one image acquisition device operatively coupled to the processing device. The processing device is programmed to, when in a first mode of operation, to cause the display to display a portion of the cartographic navigation map data, the displayed portion based on the location data received by the processing device. The processing device is further configured, when in a second mode of operation, to cause the display to display an image acquired by the at least one image acquisition device. The image is overlaid by one or more symbols indicative of one or more points of interest within the database of cartographic navigation map data, the one or more symbols correlated to the acquired image based on the location data received by the processing device.

In another aspect, an augmented navigation method for a navigation device is provided. The method includes determining if the navigation device is in a map display mode or in an acquired image display mode, and if the navigation device is determined to be in a map display mode the method includes determining a location of the navigation device and displaying a portion of a cartographic map associated with the determined location. If the navigation device is determined to be in an acquired image display mode, the method includes determining a location of the navigation device, displaying an acquired image, correlating the acquired image to a portion of a cartographic map associated with the determined location, and displaying overlays of points of interest on the acquired image, the points of interest stored in the cartographic map data, the overlays correlated to be in a correct position with respect to the acquired image.

In still another aspect, a navigation device is provided that includes a processing device, a memory communicatively coupled to the processing device, the memory including a database of cartographic navigation map data, a GPS receiver operable to provide location data to the processing device, a display operatively coupled to the processing device, at least one image acquisition device operatively coupled to the processing device, and a sensor operable for determining an orientation of the navigation device. Wherein in a first determined orientation, the processing device is programmed to cause the display to display a portion of the cartographic navigation map data based on location data received by the processing device, and wherein in a first determined orientation, the processing device is programmed to cause the display to display an image acquired by the at least one image acquisition device, the image overlaid by one or more symbols related to the cartographic navigation map data.

The features, functions, and advantages that have been discussed can be achieved independently in various embodiments or may be combined in yet other embodiments further details of which can be seen with reference to the following description and drawings.

DETAILED DESCRIPTION

The described embodiments are related to a navigation device and method where the navigation device operates as a conventional cartographic navigation tool when in a first mode of operation or a default position, referred to herein as a cartographic or map display mode, and as an augmented reality device when in a second mode of operation or a non-default position, referred to herein as an acquired image display mode or live mode (since the display associated with the device is displaying a "live" picture as acquired by an image acquisition device). In one contemplated embodiment, the default position is considered to be horizontal, due to the display being oriented horizontally, while the non-default position is considered to be vertical, due to the display being oriented vertically. As such, the terms "horizontal orientation", "vertical orientation" and similar terms may be utilized herein, but should be considered non-limiting examples. Further, though the embodiments are sometimes described herein with respect to marine navigation, the embodiments are not so limited and can be construed to include land and/or airborne navigation embodiments.

Figure 1:
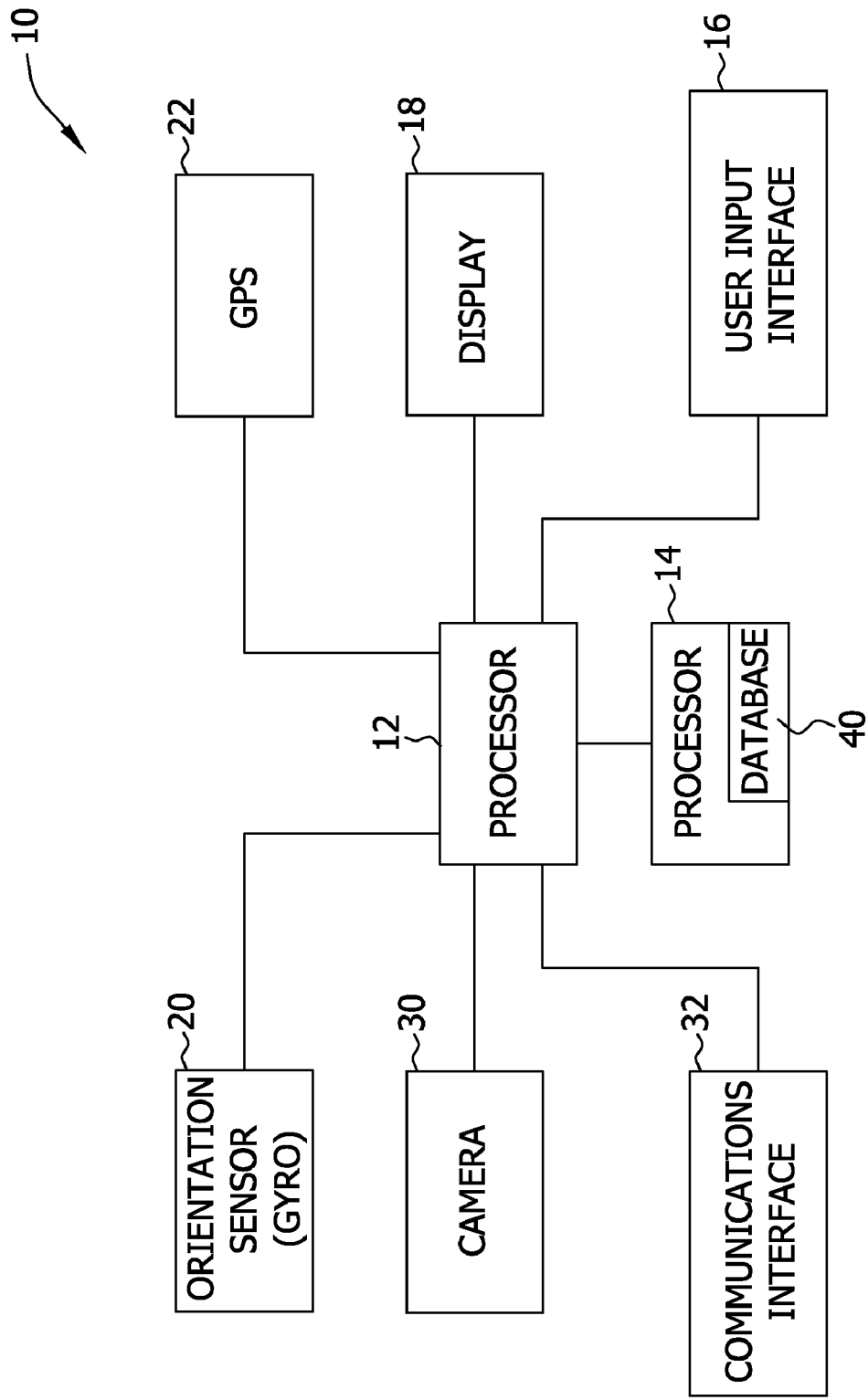
FIG. 1 is a block diagram of an augmented reality navigation system.

Turning now to FIG. 1, a block diagram of an augmented reality navigation device 10 is depicted in accordance with an illustrative embodiment. Navigation device 10 includes a processor 12 communicatively coupled to a memory 14, a user input interface 16, and a display 18. Further, an orientation sensor 20, for example a gyroscope, is communicatively coupled to the processor 12 such that the processor 12, based on the program running thereon, is able to determine an orientation of navigation device 10. In one specific embodiment, orientation sensor 20 includes a compass and two gyroscopes. In addition, a GPS sensor 22 is communicatively coupled to the processor 12 such that the processor, based on the program running thereon, is able to determine a location of navigation device 10. In certain embodiments, display 18 is remotely located from navigation device 10.

Image acquisition device 30, in one embodiment, is located internal to navigation device 10. In other embodiments, image acquisition device 30 is remotely located from navigation device 10. In an example, image acquisition device 30 is a camera mounted near a bow of a ship or boat. In various embodiments, image acquisition device 30 is one or more of a digital camera, a video camera, an infrared-camera, a low-light night vision camera, or any other real-time acquisition device. In the marine application, image acquisition device 30 may be mounted on a hull of the ship or boat.

Figure 2:
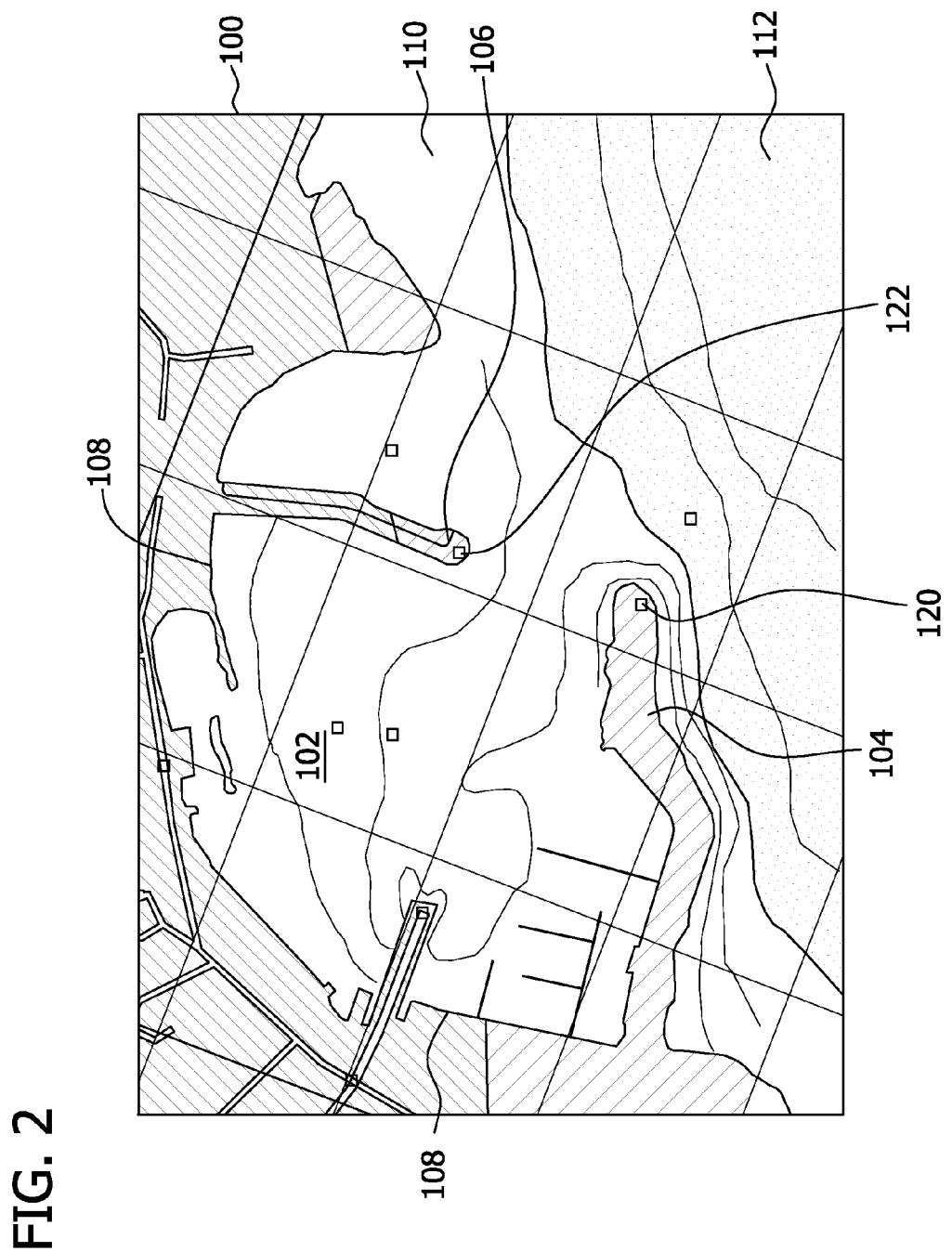
FIG. 2 is a representation of a cartographic map presented on a display of the navigation device of FIG. 1.

In one embodiment, a communications interface 32 is provided such that data originating from one or more external systems can be received by the processor 12 of navigation device 10. Similarly, communications interface 32 allows for the transmission of data from navigation device 10, via processor 12, to such external systems. In an embodiment, memory 14 includes a database 40 relating to a map, a portion of which is displayed as a cartographic map 100 on display 18, as shown in FIG. 2. In operation, the navigation device 10 utilizes, for example, Jeppesen marine navigation data for database 40 and generates the map 100 for display on display 18. Map 100 is an example of a marine map illustrating a port 102 having a first pier 104 and a second pier 106 extending outward from the shoreline 108 into the water 110. Map 100 also indicates a deep water area 112 beyond the port area 102. Of note in map 100 are the navigation markers 120 and 122 near the respective ends of piers 104 and 106.

Figure 3:
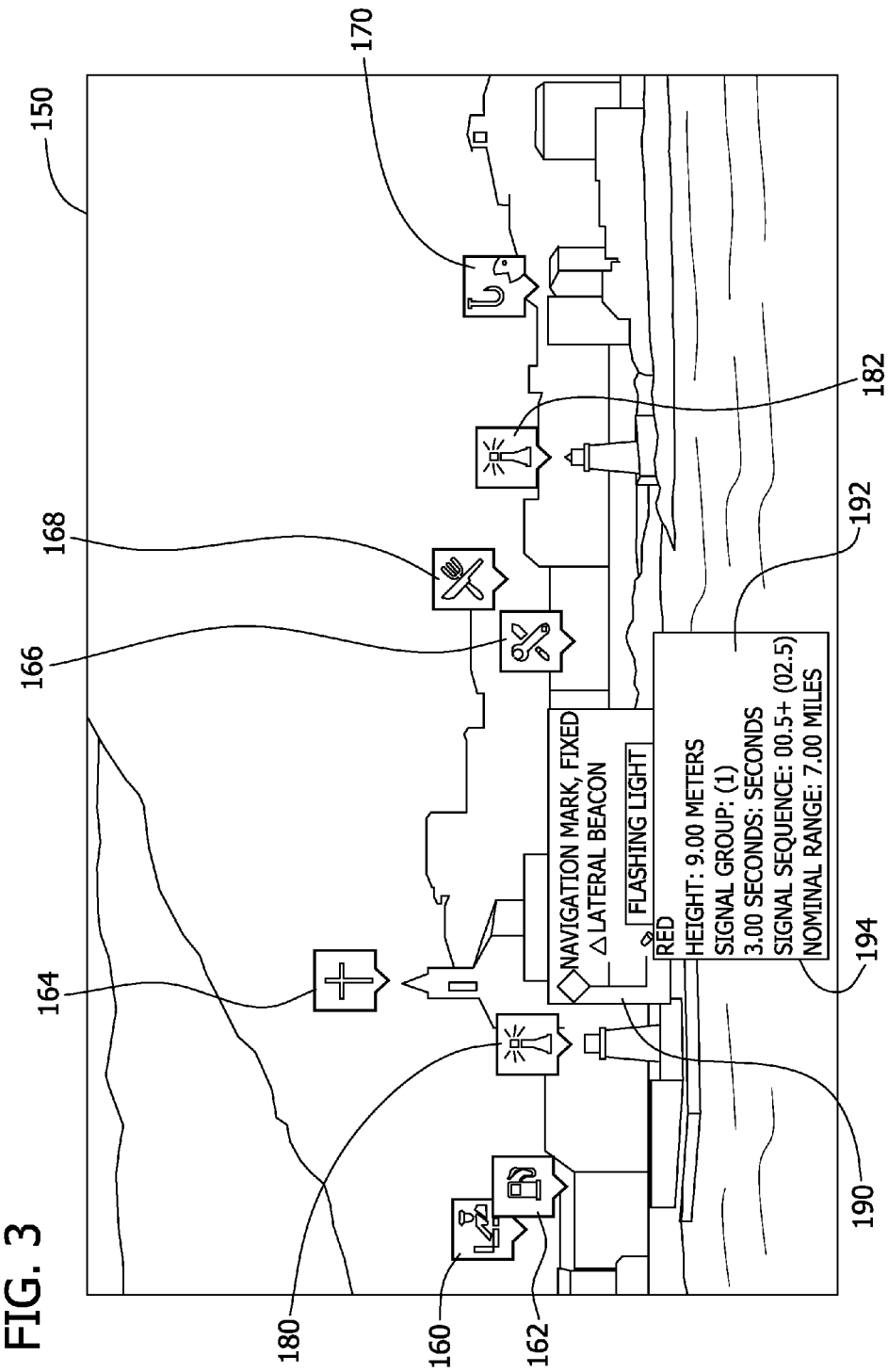
FIG. 3 is a representation of an image acquired by an image acquisition device and displayed on the display of the navigation device of FIG. 1.

FIG. 3 is an illustration of an image 150 acquired by image acquisition device 30. In one embodiment, navigation device 10 switches from display of map 100 to display of image 150 when orientation sensor 20 senses a change in the orientation of navigation device 10. In one operative example, when navigation device 10 is horizontally oriented, such as on a desk or table, map 100 is displayed, the displayed map 100 corresponding to a location of the navigation device 10 as determined by GPS sensor 22. When the navigation device 10 is vertically oriented, for example, for orienting a lens of the internal image acquisition device 30 to acquire an image, the image acquired through the lens is displayed. In other embodiments, a user input, switch or a remote control is utilized to change from a display of the map to a display of the acquired image. Such embodiments are especially useful when image acquisition device 30 is remote from navigation device 10.

Particularly, when navigation device 10 is oriented vertically (in live mode) a software application running on the processing device 12 of the navigation device 10 utilizes the above mentioned marine navigation data within database 40 and generates, using the database data, real-time overlays on the displayed image 150 that was acquired through the image acquisition device 30. As shown in FIG. 3, overlays provide an indication as to the locations of various services as well as indications relevant to navigation. With particular relevance to FIG. 3, overlays include a police station indicator 160, a fuel station indicator 162, a church indicator 164, a mechanic indicator 166, a restaurant indicator 168 and a fishing charter indicator 170.

The overlays in FIG. 3 should be understood to be examples only. Many other overlays indicative of many different types of landmarks, services and the like, including overlays relating to offshore items can be incorporated due to the relevant data being incorporated into map database 40. Of note to navigation, are fixed navigation marker indicators 180 and 182 (correlating to navigation markers 120 and 122). Again, indicators 180 and 182 are examples only. As illustrated by FIG. 3, the real-time overlays may include factual data 190 like port/marina names, port related information and services, naval-aids and any other geo-referenced objects, points of interest and place markers that are pertinent with navigation and related activities. Additionally, other factual data related to navigation may be included into such overlays, including, but not limited to, depth indicators, submerged rocks and any known shipwrecks within the vicinity.

Through user selection, additional information 192 regarding an indicator may be obtained. For example, additional information 192 regarding fixed navigation marker indicator 180 is provided in a pop-up type window 194. In particular pop-up window 194 includes the operating parameters of navigation marker 120. In one embodiment, as the acquired image 150 is in real time, the indicators are updated in position as the acquired image "moves" across the display 18 due to the movement of the platform on which the navigation device 10 is being utilized.

To provide the overlays onto image 150, navigation device 10 is programmed to correlate an acquired image with map data stored in database 40. Particularly, database 40 includes information regarding the landmarks that are highlighted through the use of the indicators. Particularly, while the image acquisition device 30 is recording an input stream, sometimes referred to herein as a live view, the image acquisition device 30 is able to also provide a view angle and a focal length of the lens associated with the image acquisition device 30 to processor 12 to accomplish the above described correlation between the map database 40 and the acquired image. In embodiments, the afore-mentioned compass and gyroscope are configured to determine which direction the lens of the image acquisition device is directed. Combining the information from the image acquisition device, GPS data, and gyroscope data with the map data stored in navigation device 10 allows for the correct assignment of a coordinate to each element (overlay) on the display 18, by calculating its relative position to the edge of the acquired image.

Ephemeral data such as that captured by real-time sensors (e.g., weather, wind) may be included on the image displayed on display 18. For example, relevant and/or personal information about the other vessels/people operating, for example, out of a port may be provided. In an embodiment, such information is provided in real time from sensors placed on other vessels and received via communications interface 32. An example of such information includes, but is not limited to, information about the weather in a nearby location where a boat, also equipped with a navigation device 10 is at anchor. In another example, in a Regatta environment, navigation device 10 could receive speed and course information relating to a competing boat, or a live camera feed from the same boat. Those familiar with navigation will understand that there are a large number of information exchanges that would be useful to mariners.

Those skilled in the art also will understand that the systems and methods described herein can be applied on various commercial platforms, including, but not limited to, smart-phones, personal navigation devices, mobile computing platforms and any other computing device connected with a real-time video camera, including but not limited to marine chart-plotters and navigation systems. The resulting device is a cartographic chart-plotter or navigation system, fixed or mobile with an external or embedded video-camera(s). Such a device provides information that may be valuable to the user as well as providing an increased situational awareness when navigating in standard conditions, as well as extreme conditions, displaying information layers on real-time images of the surrounding environment.

Figure 4:
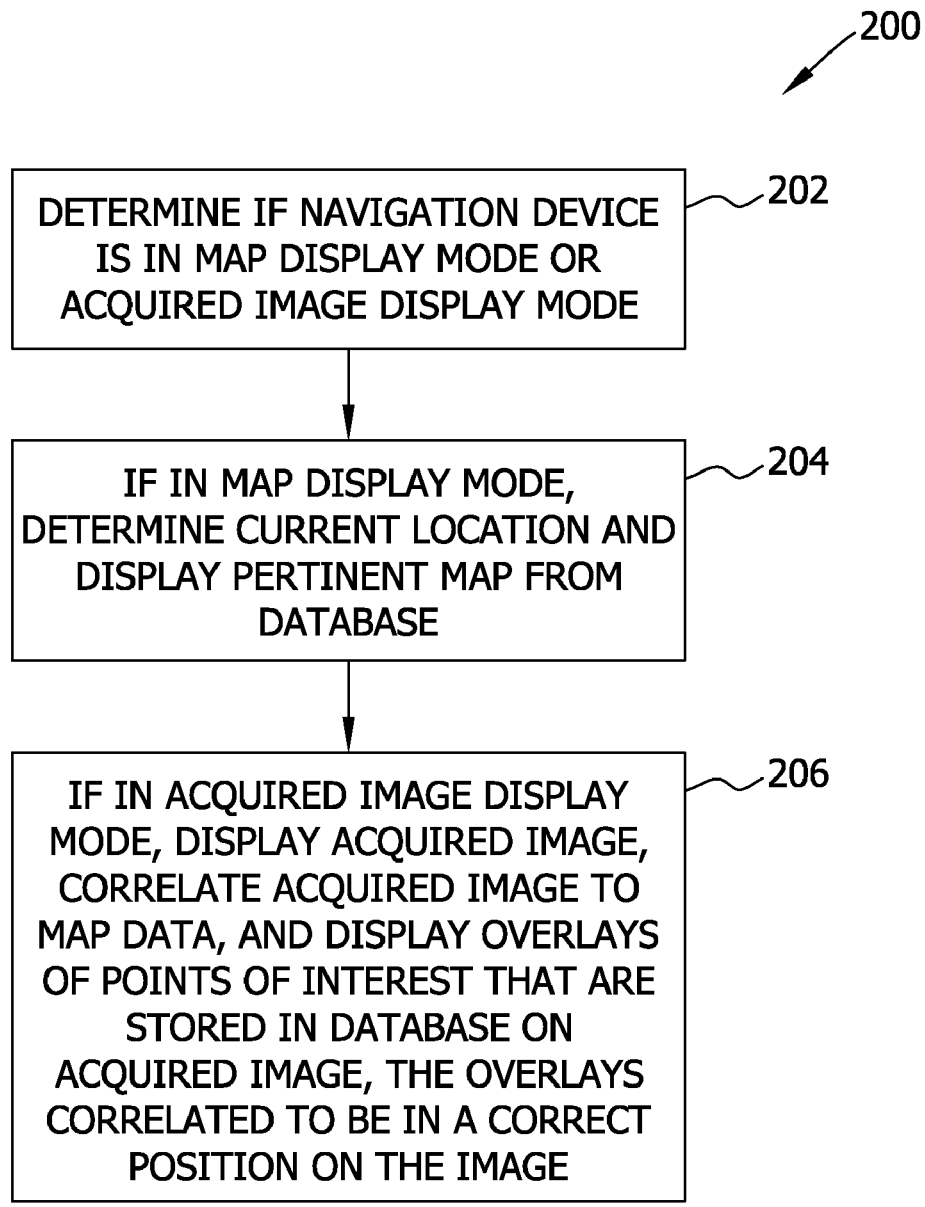
FIG. 4 is a flowchart illustrating a process employed by at least one embodiment of the navigation device of FIG. 1.

FIG. 4 is a flowchart 200 illustrating a process employed by at least one embodiment of navigation device 10. Upon power up, the navigation device 10 determines 202 whether it is in a map display mode or in an acquired image display mode. As described above, determination of the display mode is based on one of an orientation of navigation device 10 as determined by the orientation sensor 20, or the user input of a switch or other user input, such as a remote control.

If it is determined 204 the navigation device 10 is in a map display mode, a current position of the navigation device 10 is sensed and calculated and a portion of the map stored in the database proximate the current position is displayed on the display of the navigation device.

If it is determined 206 the navigation device 10 is in an acquired image display mode, a current position of the navigation device 10 is sensed and calculated and the acquired image is displayed on the display. Further, the acquired image is correlated with the map data in the database, and at least one point of interest stored within the data making up the map database is overlaid on the acquired image, the point(s) of interest overlaid such that they are correctly positioned with respect to the acquired image.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A navigation device comprising:
   a processing device;
   a memory communicatively coupled to said processing device, said memory comprising a database of cartographic navigation map data;
   a first sensor operable to provide location data to said processing device;
   a display operatively coupled to said processing device;
   a gyroscope; and
   at least one image acquisition device operatively coupled to said processing device, said processing device programmed to, when in a first mode of operation, to cause said display to display a portion of the cartographic navigation map data, the displayed portion based on the location data received by said processing device, and said processing device configured, when in a second mode of operation, to cause said display to display an image acquired by said at least one image acquisition device, the image overlaid by one or more symbols indicative of one or more points of interest within the database of cartographic navigation map data, the one or more symbols correlated to the acquired image based on the location data received by said processing device, said at least one image acquisition device being operable to provide a view angle and a focal length of a lens associated with said at least one image acquisition device to said processing device, said gyroscope being operable to determine which direction the lens of said at least one image acquisition device is directed, the directional information calculated by said processing device using received gyroscope data, and said processing device being programmed to correlate the view angle, focal length, and directional information with the map data in said database to assign a coordinate to each symbol on said display by calculating its relative position to an edge of the acquired image.

2. The navigation device of claim 1 further comprising a second sensor, an orientation of said navigation device, as sensed by said second sensor, operable for switching said navigation device between the first mode of operation and the second mode of operation.

3. The navigation device of claim 2 wherein the first mode of operation is enabled by said second sensor sensing said navigation device is in a horizontal position, and the second mode of operation is enabled by said second sensor sensing said navigation device is in a vertical position.

4. The navigation device of claim 1 wherein at least one of said display and said at least one image acquisition device are remotely located from said navigation device.

5. The navigation device of claim 1 further comprising a switch, said switch operable for switching said processing device from a first mode of operation to a second mode of operation.

6. The navigation device of claim 1 further comprising a user input interface, said interface operable for selecting an overlaid point of interest displayed on said display, said processing device programmed to overlay additional data related to the selected point of interest on said display.

7. The navigation device of claim 1 wherein said at least one image acquisition device comprises at least one of a digital camera, a video camera, an infrared-camera, and a low-light night vision camera.

8. The navigation device of claim 1 further comprising a communications interface communicatively coupled to said processing device, said communication interface operable for receiving sensor information associated with another said navigation device deployed remotely from said navigation device.

9. An augmented navigation method for a navigation device comprising:
   determining if the navigation device is in a map display mode or in an acquired image display mode;
   if the navigation device is determined to be in a map display mode,
      determining a location of the navigation device, and
      displaying a portion of a cartographic map associated with the determined location; and
   if the navigation device is determined to be in an acquired image display mode,
      determining a location of the navigation device,
      providing a view angle and a focal length of a lens associated with an image acquisition device coupled to the navigation device,
      determining, using a gyroscope, which direction the lens of the image acquisition device is directed,
      correlating the view angle, focal length, and directional information with the cartographic map data, assigning a coordinate to each symbol on a display by calculating its relative position to an edge of an acquired image, displaying the acquired image, and displaying overlays of points of interest on the acquired image, the points of interest stored in the cartographic map data, the overlays correlated to be in a correct position with respect to the acquired image.

10. The augmented navigation method of claim 9 wherein determining if the navigation device is in a map display mode or in an acquired image display mode comprises:

receiving data from an orientation sensor within the navigation device; and placing the navigation device into the map display mode or the acquired image display mode based on the received data.

11. The augmented navigation method of claim 9 wherein determining if the navigation device is in a map display mode or in an acquired image display mode comprises:

receiving an external input within the navigation device; and placing the navigation device into the map display mode or the acquired image display mode based on the received input.

12. The augmented navigation method of claim 9 wherein determining a location of the navigation device comprises receiving location data from a GPS within the navigation device.

13. The augmented navigation method of claim 9 further comprising:

using a user interface to select one of the overlays; and overlaying additional data relating to the selected point of interest.

14. A navigation device comprising:

a processing device;

a gyroscope;

a memory communicatively coupled to said processing device, said memory comprising a database of cartographic navigation map data;

a GPS receiver operable to provide location data to said processing device;

a display operatively coupled to said processing device;

at least one image acquisition device operatively coupled to said processing device; and a sensor operable for determining an orientation of said navigation device, wherein in a first determined orientation, said processing device is in a first mode of operation and is programmed to cause said display to display a portion of the cartographic navigation map data based on location data received by said processing device, and wherein in a second determined orientation, said processing device is in a second mode of operation and is programmed to cause said display to display an image acquired by said at least one image acquisition device, the image overlaid by one or more symbols related to the cartographic navigation map data, said at least one image acquisition device being operable to provide a view angle and a focal length of a lens associated with said at least one image acquisition device to said processing device, said gyroscope being operable to determine which direction the lens of said at least one image acquisition device is directed, the directional information calculated by said processing device using received gyroscope data, and said processing device being programmed to correlate the view angle, focal length, and directional information with the map data in said database to assign a coordinate to each symbol on said display by calculating its relative position to an edge of the acquired image.

15. The navigation device of claim 1 further comprising a communications interface communicatively coupled to said processing device, said communication interface operable for receiving data related to another said navigation device deployed remotely from said navigation device.

16. The navigation device of claim 14 wherein said processing device is programmed to utilize data received from said at least one gyroscope to switch said navigation device between the display of cartographic navigation map data and an image acquired by said at least one image acquisition device.

17. The navigation device of claim 14 further comprising a user input interface, said interface operable for selecting an overlaid symbol displayed on said display, said processing device programmed to overlay additional data related to a point of interest represented by said symbol.

18. The navigation device of claim 14 wherein said at least one image acquisition device comprises at least one of a digital camera, a video camera, an infrared-camera, and a low-light night vision camera one or more of which may be remote from said navigation device.

* * * * *